(12) United States Patent
Bell

(10) Patent No.: US 6,484,926 B2
(45) Date of Patent: Nov. 26, 2002

(54) VAPOR PHASE REFLOW SYSTEM WITH SUPERHEATED VAPOR

(75) Inventor: Hans Bell, Berlin (DE)

(73) Assignee: Rehm Anlagenbau GmbH + Co. KG, Blaubeuren-Seissen (DE)

( * ) Notice: Subject to any disclaimer, the term of this patent is extended or adjusted under 35 U.S.C. 154(b) by 0 days.

(21) Appl. No.: 09/852,079

(22) Filed: May 8, 2001

(65) Prior Publication Data

US 2002/0007565 A1 Jan. 24, 2002

(30) Foreign Application Priority Data

May 23, 2000 (DE) .......................... 100 25 472

(51) Int. Cl.$^7$ .......................... B23K 31/02; B23K 37/00
(52) U.S. Cl. .......................... 228/234.2; 228/8
(58) Field of Search .......................... 228/102, 234.2, 228/56.1, 56.2, 8; 34/60

(56) References Cited

U.S. PATENT DOCUMENTS

| | | | | |
|---|---|---|---|---|
| 3,904,102 A | * | 9/1975 | Chu et al. | |
| 4,077,467 A | * | 3/1978 | Spigarelli | |
| 4,264,299 A | * | 4/1981 | Ammann et al. | |
| 4,321,031 A | * | 3/1982 | Woodgate | |
| 4,327,271 A | * | 4/1982 | Bentley et al. | |
| 4,389,797 A | * | 6/1983 | Spigarelli et al. | |
| 4,392,049 A | * | 7/1983 | Bentley et al. | |
| 4,589,956 A | * | 5/1986 | Westby | |
| 4,612,712 A | * | 9/1986 | Pescatore et al. | |
| 4,762,264 A | | 8/1988 | Peck | 228/37 |
| 4,801,069 A | * | 1/1989 | Ankrom et al. | |
| 4,802,276 A | * | 2/1989 | Bowcutt et al. | |
| 4,840,305 A | * | 6/1989 | Ankrom et al. | |
| 4,909,429 A | * | 3/1990 | Ankrom et al. | |
| 4,909,430 A | * | 3/1990 | Yokota | |
| 6,015,966 A | * | 1/2000 | Rehm | |
| 6,116,497 A | * | 9/2000 | Scheel et al. | |

FOREIGN PATENT DOCUMENTS

| | | | |
|---|---|---|---|
| EP | 0247815 A2 | * | 12/1987 |
| EP | 1157771 A2 | * | 12/2001 |
| GB | 2190687 | | 11/1987 |

OTHER PUBLICATIONS

US 2002/0007565 A1 Bell (Jan. 24, 2002).*

* cited by examiner

Primary Examiner—Tom Dunn
Assistant Examiner—Kiley Stoner
(74) Attorney, Agent, or Firm—Sheridan Ross P.C.

(57) ABSTRACT

The present invention relates to a vapor phase reflow system comprising at least one soldering zone and a process zone, a primary liquid reservoir containing a primary liquid, the vapor phase reflow system further comprising a heating means for converting the primary liquid into the vapor phase. The system is characterized in that primary liquid or the vapor thereof or both can be introduced by means of a primary-liquid fluid line into a soldering-zone heating module in fluid communication with the soldering zone and into a process-zone heating module in fluid communication with the process zone, the heating capacity of the soldering-zone heating module and of the process-zone heating module being adjustable independently of each other to thereby generate superheated vapor based on the zones. Furthermore, the invention relates to a method for operating a vapor phase reflow system.

13 Claims, 1 Drawing Sheet

VAPOR PHASE REFLOW SYSTEM WITH SUPERHEATED VAPOR

FIELD OF THE INVENTION

The present invention relates to a vapor phase reflow system comprising a soldering zone and a process zone, a primary liquid reservoir containing a primary liquid, the vapor phase reflow system further comprising a heating means for converting the primary liquid into the vapor phase.

DESCRIPTION OF THE RELATED ART

As is generally known, in the case of vapor phase reflow upon condensation of a saturated vapor phase, energy is liberated in the form of heat on the surface of a component to be soldered, whereby the solder is molten and the component is thus connected to the conducting track. The saturated vapor phase is produced by a boiling primary liquid, with the process temperature being predetermined by the boiling point of the primary liquid during soldering. Although the reflow or soldering process with saturated vapor is characterized by an exactly defined soldering temperature with uniform heating of the component to be soldered and is thus particularly well suited for processing components having different heating capacities, this method is somewhat limited since the soldering temperature cannot be freely chosen in an easy way as the temperature is actually predetermined by the very boiling point of the primary liquid.

An improvement in this respect is achieved with systems in which the vapor does not directly interact with its liquid phase any more. Small amounts of the primary liquid are here completely evaporated in the soldering space of the system, whereby amounts of vapor that are needed very quickly can continuously be produced and the available amount of heat can thus also be controlled to some extent. Nevertheless, this principle is also based on the measure that the boiling temperature of the primary liquid always forms an upper limit temperature, whereby a possibly desired temperature profile throughout the soldering operation can only be achieved through the residence times of the subassemblies to be soldered in the vapor. As a result, either the throughput of such a system is considerably reduced because of the increased residence time, or it sometimes happens that certain subassemblies which require a special type of temperature profile cannot be processed at all.

Furthermore, the prior art also reports on vapor phase reflow systems which employ superheated vapor so as to control the process temperature. For instance, GB-2 190 687 discloses a method and an apparatus in which superheated vapor is provided in the soldering zone by means of a suitable heating means, with the superheated vapor condensing at a certain level by means of cooling elements and being returned via a filter into a liquid reservoir for the primary liquid. In this known system, however, a complicated temperature profile cannot be adjusted together with a high throughput.

SUMMARY OF THE INVENTION

It is therefore the object of the present invention to provide an improved vapor phase reflow system in which a necessary temperature profile can be adjusted for the soldering process together with a high throughput of subassemblies to be soldered.

The present invention is characterized in that in the above-mentioned vapor phase reflow system primary liquid or the vapor thereof or both can be introduced by means of a primary-liquid fluid line into a soldering-zone heating module in fluid communication with the soldering zone and into a process-zone heating module in fluid communication with the process zone, the heating capacities of the soldering-zone heating module and of the process-zone heating module being adjustable independently of each other for generating superheated vapor based on the zones.

According to the present invention the primary liquid is heated by the heating means or converted into the vapor phase, which can take place at an adjustable or fixedly predetermined pressure and can then be passed to the various heating modules by means of the primary-liquid fluid line. In the heating modules the vapor and/or the primary liquid can be superheated to a freely selectable temperature by controlling the heating capacity of the vapor and/or the primary liquid. The superheated vapor can then be passed by means of nozzles or by means of convection onto the subassemblies to be processed into the respective zones. Hence, the process zone, which can e.g. serve as a preheating zone or second soldering zone, as well as the soldering zone can be operated with the vapor of the same primary liquid. This minimizes the operating costs of such a system, with the zone temperatures being freely selectable at the same time and permitting an individual adjustment of the soldering profile, as is standard in common convection systems. Thus the system of the invention makes it possible to achieve an individual temperature profile of the reflow type soldering process without the throughput of the system primarily depending on the residence time of the subassemblies to be processed within a condensation zone.

In a further embodiment of the present invention the primary-liquid fluid line comprises respectively controllable valve elements so that the amount of primary liquid or its vapor or both can be introduced in a controllable manner into the soldering-zone heating module and the process-zone heating module.

It is possible with this embodiment to control the amount of the superheated vapor in addition to the temperature of the superheated vapor generated in the respective heating modules and to thereby meet the demand for superheated vapor individually for different subassemblies in the soldering zone and the process zone, respectively. This results in a further reduction of the residence time because e.g. in the case of subassemblies comprising components of a relatively high heating capacity, it is possible to increase the amount of heat to be transferred per time unit by increasing the supplied amount of superheated vapor.

In a further embodiment the vapor phase reflow system comprises a respective fluid connection for discharging primary liquid and its vapor, respectively, so that the discharged primary liquid or the vapor thereof can be returned into the primary liquid reservoir and/or into the heating element for further vapor generation.

Since the vapor phase reflow system according to the invention can be operated with only one primary liquid, the primary liquid condensed in the process zone or soldering zone can be returned in a common line to the primary liquid reservoir or the heating element acting as a vapor generator. Advantageously, a corresponding filter element is provided in this fluid connection for purifying the returned and condensed primary fluid.

In a further embodiment the heating means for evaporating primary liquid is composed of partial heating elements and at least one partial heating element is provided in the soldering-zone heating module.

Thus, thanks to the modular structure of the heating element, primary liquid can be evaporated in addition and rapidly in the soldering-zone heating module upon demand and can then be superheated. To this end the primary-liquid fluid line suitably comprises a connection to the primary liquid reservoir so that primary liquid is permanently available in the soldering-zone heating module.

In a further development of the present invention a further partial heating element is provided in the process zone heating module.

When a partial heating element for evaporating primary liquid is provided in both the process-zone heating module and the soldering-zone heating module, a joint heating module for evaporating primary liquid can be completely omitted and the primary-liquid fluid line can be designed such that only primary liquid is transported to the process-zone heating module and the soldering-zone heating module. This results in a simple construction of the line system and reduces the overall losses of the system because the losses created during transportation of the vapor are avoided.

In a further embodiment of the present invention at least one second process zone is provided, the process zone serving as a preheating zone and the second process zone as a cooling zone, and the second process zone being in fluid communication with a second process-zone heating module into which primary liquid or vapor or both can be introduced via the primary-liquid fluid line.

Thanks to the provision of at least one second process zone, which is again equipped with an associated heating-zone module, complex heating profiles can be achieved for the soldering process. For instance, an individual temperature profile is possible within a wide range owing to the provision of two process zones with respectively associated process-zone heating modules, which serve as preheating zones, of a soldering zone and of a further process zone, which serves as a cooling zone. Furthermore, it is also possible to provide further process zones in combination with the process zone, the second process zone and the soldering zones, the further process zones being not operable by means of superheated vapor, but comprising conventional convection and/or infrared heating modules.

According to a further aspect the present invention refers to a method for operating a vapor phase reflow system, with a primary liquid being evaporated by means of a heating element, and the method being characterized in that the vapor of the primary liquid is superheated zonewise and in a controllable manner in a soldering-zone heating module in fluid communication with a soldering zone and in a process-zone heating module in fluid communication with a process zone.

In a further embodiment the temperature in the process zone and in the soldering zone is adjusted by controlling the amount of the introduced superheated vapor and/or the temperature of the superheated vapor.

The advantages of the method according to the invention have already been indicated in connection with the embodiments of the apparatus according to the invention.

BRIEF DESCRIPTION OF THE DRAWING

The figure shows a schematic block diagram in accordance with one illustrative embodiment of the present invention.

DETAILED DESCRIPTION OF THE INVENTION

Figure 1:
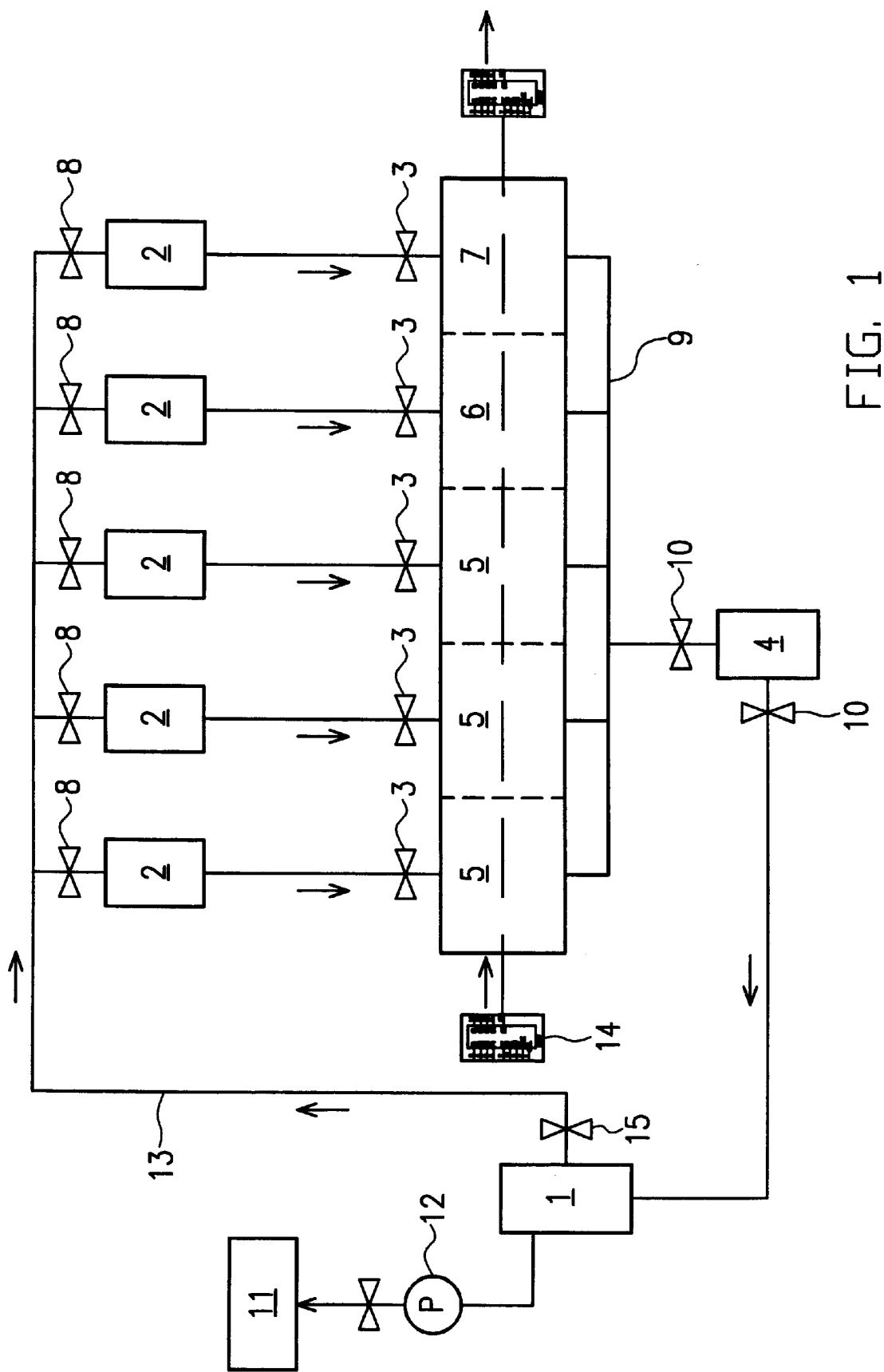

The present invention shall now be described with reference to the following description of the drawing by way of a detailed example.

In the figure, reference numeral 11 designates a reservoir for a primary liquid. Already known media that are employed in conventional vapor phase reflow systems can be used as the primary liquid. Furthermore, it is possible in the vapor phase reflow system of the invention to use water as the primary liquid as well. The reservoir 11 is connected via a pump 12 and a feed line to a heating element 1 which serves as a vapor generator.

The heating element 1 is connected via a shut-off valve 15 to a primary-liquid fluid line 13 which, in turn, communicates with several heating modules 2. In this embodiment three heating modules 2 are respectively assigned to three process zones serving as preheating zones 5. A further heating module 2 is assigned to a soldering zone 6, and a fifth heating module 2 to a cooling zone 7. The inlet side of each heating module has provided thereat a valve element 8 which is preferably designed as an adjustable valve to choose the amount of vapor introduced into the corresponding heating module in response to the conditions prevailing during the soldering process, i.e. in response to the necessary temperature, etc. The heating modules 2 have provided therein corresponding heating means (not shown in the figure) whose heating capacity can be controlled such that the vapor introduced into the respective heating module can be individually superheated for each of the zones 5, 6 and 7. The heating means are preferably designed such that even when large amounts of vapor are needed an adequate heating capacity is available for permitting superheating to a necessary process temperature. Inlet valves 3 are respectively provided between the heating modules 2 and the respectively assigned process zones 5, 6 and 7. Furthermore, the process zones 5, 6 and 7 are connected by means of a collecting line 9 via a valve 10 to a filter 4 which, in turn, communicates via a further valve 10 with the heating element 1.

During operation primary liquid is conveyed into the heating element by means of the pump 12 and converted there into the vapor phase. Vapor can be generated in the heating element 1 at an adjustable or also fixedly predetermined pressure. The vapor which is superheated to the suitable temperature is passed via a fluid connection into the corresponding process zone or soldering zone. It is there transferred by means of convection or with the help of nozzles, which are e.g. provided as perforated-plate fields or nozzle blocks in the modules, to the subassemblies. When the temperature profile needed for the soldering operation is adjusted in the system, i.e. when the individual preheating zones 5; the soldering zone 6 and the cooling zone 7 have reached their necessary operating temperature, a subassembly 14 to be soldered is introduced into the first one of the preheating zones 5. The superheated vapor which in the individual process or soldering zones has exchanged thermal energy, preferably in the form of kinetic energy, with the subassembly to be processed, partly condenses in some process zones and is passed by means of the collecting line 9 via the valve element 10 into the filter 4. From the filter 4 the purified primary liquid is returned into the heating element 1 or vapor generator.

An electronic control means (not shown in the figure), e.g. in the form of a microprocessor or a PC, is provided for controlling the whole soldering operation. To this end the temperatures of the individual process or soldering zones are constantly monitored by means of suitably mounted sensors, and the corresponding heating modules as well as the control valves 8 are activated such that the temperatures in the individual zones are observed in accordance with the predetermined reflow profile.

As already mentioned at the outset, the heating element 1 or the vapor generator can also be provided in modular form as a partial element in one or several or all of the heating modules 2. When a separate vapor generator is provided in each of the heating modules 2, the primary liquid can directly be conveyed from the reservoir 11 via the primary-liquid fluid line 13 to the corresponding modules. The amount of the required superheated vapor can then be determined by both the supply of primary liquid regulated by means of valves 8 and by the heating capacity of the modular heating element in the heating modules. Furthermore, all of the process zones need not necessarily be connected to corresponding heating modules. For instance, two of the preheating zones 5 could be fed with superheated vapor from a joint heating module, each via a controllable valve or nozzle. Furthermore, the individual process or soldering zones may additionally comprise further heating means, e.g. a radiant heating system or a convection heating system or a combination thereof.

Furthermore, it is also possible to divide the soldering zone into two or more zones, for instance, by providing separately adjustable heating elements in the soldering zone.

While the present invention is described with reference to the embodiments as illustrated in the detailed description as well as in the drawing, it is not intended that the present invention be limited to the specific forms set forth herein, but, on the contrary, it is intended to cover such alternatives, modifications and equivalents which can be reasonably included within the spirit and scope of the invention as defined by the appended claims.

What is claimed is:

1. A vapor phase reflow system comprising:
   at least one soldering zone and a process zone;
   a primary liquid reservoir containing a primary liquid;
   a heating means for converting the primary liquid into the vapor phase;
   a soldering-zone heating module in fluid communication with the soldering zone;
   a process-zone heating module in fluid communication with the process zone; and
   a primary-liquid fluid line to introduce at least one of the primary liquid and the vapor thereof into the soldering-zone heating module and into the process-zone heating module; wherein
   the heating capacity of the soldering-zone heating module and that of the process-zone heating module are adjustable independently of each other to thereby produce zone-specifically superheated vapor.

2. The vapor phase reflow system according to claim 1, wherein the primary-liquid fluid line comprises respectively controllable valve elements so that an amount of the primary liquid or the vapor thereof or both can be introduced, each in a controllable manner, into the soldering-zone heating module and the process-zone heating module.

3. The vapor phase reflow system according to claim 1, wherein the vapor-phase reflow system comprises a respective fluid connection for discharging primary liquid, so that the discharged primary liquid can be returned from the process zone and the soldering zone into the primary liquid reservoir and/or the heating element.

4. The vapor phase reflow system according to claim 1, wherein the heating means for evaporating primary liquid comprises partial heating elements, and at least one partial heating element is provided in the soldering-zone heating module.

5. The vapor phase reflow system according to claim 4, wherein a further partial heating element is provided in the process-zone heating module.

6. The vapor phase reflow system according to claim 1, further comprising: at least one second process zone, the process zone serving as a preheating zone and the second process zone serving as a cooling zone, and a second process-zone heating module in fluid communication with the second process zone into which primary liquid or vapor or both can be introduced via the primary-liquid fluid line.

7. A method of operating a vapor phase reflow system, the method comprising: evaporating a primary liquid by means of a heating element; and introducing vapor of the primary liquid into a process zone and a soldering zone of the vapor phase reflow system in an adjustably superheated manner.

8. The method according to claim 7, further comprising:
   adjusting a temperature in the process zone and the soldering zone by controlling at least one of an amount of the introduced superheated vapor and a temperature of the superheated vapor.

9. A vapor phase reflow system comprising:
   a soldering zone;
   a process zone operatively associated with said soldering zone;
   a primary-liquid reservoir configured to receive a primary liquid, said primary-liquid reservoir in fluid communication with at least one of said soldering zone and said process zone;
   a first heating means in fluid communication with said primary-liquid reservoir, said first heating means for converting the primary liquid into a vapor phase;
   a second heating means in fluid communication with the first heating means, the soldering zone and the process zone, the second heating means being configured to supply a superheated vapor derived from said vapor phase to at least one of the soldering zone and the process zone.

10. The vapor phase reflow system as claimed in claim 9, wherein said second heating means comprises a process zone heating module in fluid communication with the process zone, and a soldering zone heating module in fluid communication with the soldering zone.

11. A vapor phase reflow system comprising:
    a heating assembly in fluid communication with a soldering zone and a process zone, wherein the heating assembly is configured to evaporate a primary liquid into a vapor phase, and to individually supply a superheated vapor derived from said vapor phase to said soldering zone and said process zone.

12. The vapor phase reflow system as claimed in claim 11, wherein said heating assembly is configured to individually adjust a heating capacity provided to the soldering zone and the process zone.

13. The vapor phase reflow system as claimed in claim 11, wherein the heating assembly comprises a soldering zone heating module and a process zone heating module.

* * * * *